US011956009B2

(12) United States Patent
Kawakita et al.

(10) Patent No.: US 11,956,009 B2
(45) Date of Patent: Apr. 9, 2024

(54) OPTICAL COMMUNICATION SYSTEM AND OPTICAL COMMUNICATION METHOD (71) Applicant: NIPPON TELEGRAPH AND TELEPHONE CORPORATION, Tokyo (JP)

(72) Inventors: Atsuko Kawakita, Musashino (JP); Yasutaka Kimura, Musashino (JP); Kazutaka Hara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 38 days.

(21) Appl. No.: 17/911,238

(22) PCT Filed: Mar. 17, 2020

(86) PCT No.: PCT/JP2020/011746
§ 371 (c)(1),
(2) Date: Sep. 13, 2022

(87) PCT Pub. No.: WO2021/186558
PCT Pub. Date: Sep. 23, 2021

(65) Prior Publication Data
US 2023/0055033 A1 Feb. 23, 2023

(51) Int. Cl.
*H04B 10/275* (2013.01)
*H04B 10/032* (2013.01)

(52) U.S. Cl.
CPC ......... *H04B 10/032* (2013.01); *H04B 10/275* (2013.01)

(58) Field of Classification Search
CPC .......................... H04B 10/275; H04B 10/2755
See application file for complete search history.

(56) References Cited

U.S. PATENT DOCUMENTS

| 6,414,768 B1 | 7/2002 | Sakata et al. |
| 6,975,811 B1 | 12/2005 | Kakizaki et al. |
| (Continued) | | |

FOREIGN PATENT DOCUMENTS

| CN | 1889405 | * | 1/2007 | ............... H04J 14/02 |
| EP | 2299612 | * | 2/2011 | ............ H04B 10/213 |
| (Continued) | | | | |

OTHER PUBLICATIONS

E. P. Lafata, "Protection of passive optical network by using ring topology," 2012 35th International Conference on Telecommunications and Signal Processing (TSP), Prague, Czech Republic, 2012, pp. 105-110, doi: 10.1109/TSP.2012.6256262 (Year: 2012).*

(Continued)

*Primary Examiner* — Nathan M Cors
(74) *Attorney, Agent, or Firm* — Harness, Dickey & Pierce, P.L.C.

(57) ABSTRACT

An object of the present invention is to provide an optical communication system and an optical communication method capable of achieving a long transmission distance with a passive element and obtaining redundancy of a ring topology.
The optical communication system according to the present invention is a PON system having a ring configuration, in which an unequal branch optical splitter having a left-right symmetrical configuration is disposed in a trunk fiber wired in a loop shape. An OLT and an ONU have a configuration in which two sets of Tx (transmitter) and Rx (receiver) are mounted. Two sets of Tx (transmitters) and Rx (receivers) in each of a plurality of ONUs are respectively connected to left and right symmetrical ports of one unequally branched light beam SP.

7 Claims, 6 Drawing Sheets

(56) References Cited

U.S. PATENT DOCUMENTS

2001/0046344 A1    11/2001  Hayashi et al.
2006/0067696 A1*   3/2006  Kai .................... H04J 14/0238
                                                                  398/85

FOREIGN PATENT DOCUMENTS

| JP | H11275028 A | 10/1999 | | |
|----|-------------|---------|----|----|
| JP | 2001339344 A | 12/2001 | | |
| JP | 2001339371 A | 12/2001 | | |
| JP | 4429271 | * | 3/2010 | .......... H04J 14/0216 |

OTHER PUBLICATIONS

Atsuko Kawakita et al., Design for Long-Reach Coexisting PON in Consideration of Area Characteristics with Wavelength Selective Asymmetrical Splitters, OECC2019, Jul. 7, 2019.

* cited by examiner

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2020/011746, filed on Mar. 17, 2020. The entire disclosure of the above application is incorporated herein by reference.

TECHNICAL FIELD

The present disclosure relates to an optical communication system having a ring topology and an optical communication method of the optical communication system.

BACKGROUND ART

With the explosive spread of the Internet, the number of subscribers to the Fiber to the home (FTTH) providing a high-speed communication service has increased. The current FTTH service utilizes a gigabit-ethernet passive optical network (1G-EPON) at a communication speed of 1 Gbit/s. To support the increased number of subscribers due to further spread of the Internet, application to a backhaul line for the fifth generation mobile communication system and the Internet of Things (IoT), a distribution service of 4K/8K high-definition video, and the like in the future, further wider bandwidth is awaited. Currently, for these requirements, 10G-EPON that has already been standardized, 40 Gbit/s-class PON (ITU-T Rec G.989 series), and 100 Gbit/s-class next-generation PON systems (IEEE 802.3 ca) have been actively discussed by the standardization organizations such as IEEE and ITU.

Figure 1:
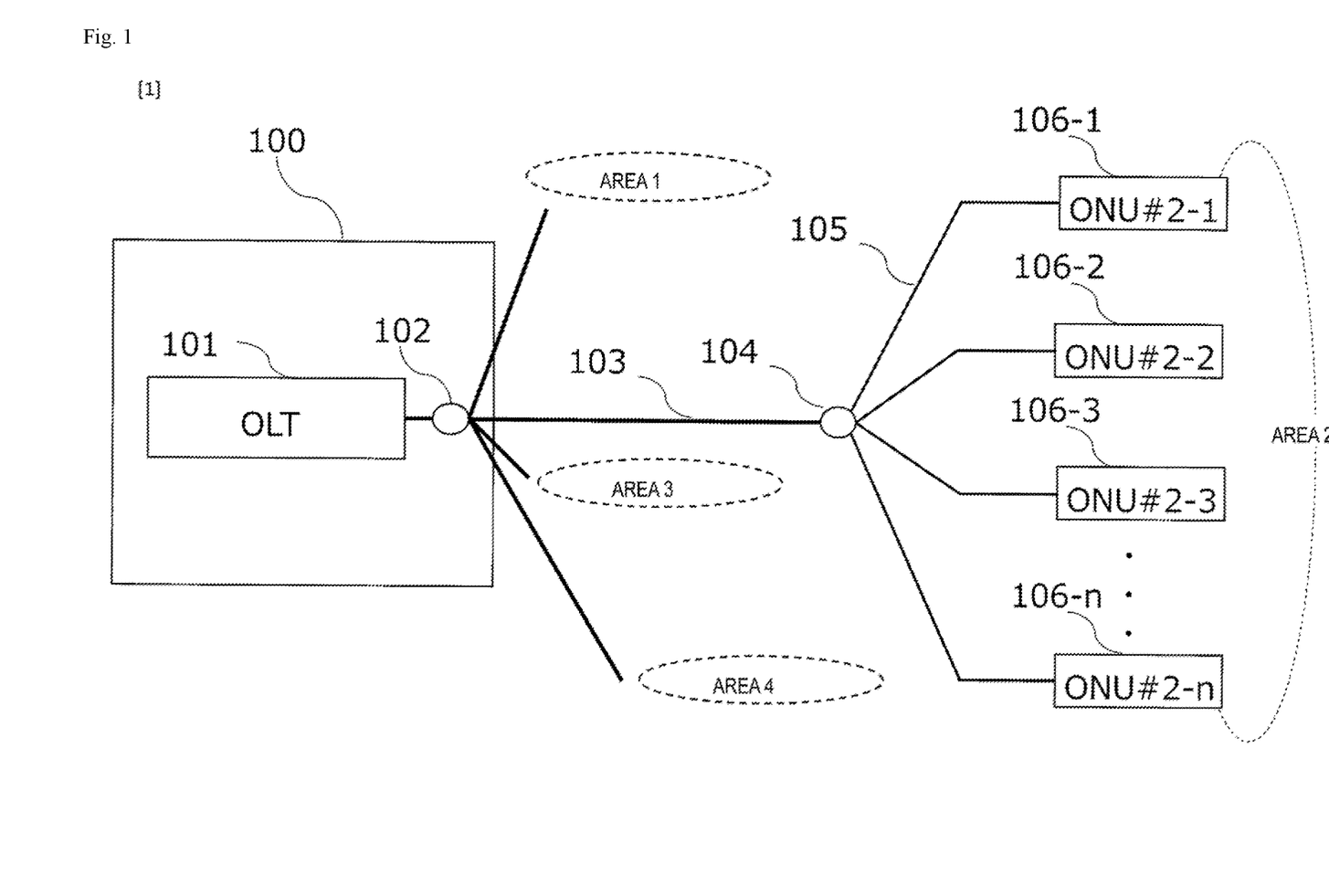
FIG. 1 is a diagram illustrating a typical double star PON system.

To efficiently and economically accommodate subscribers deployed in wide areas for general the FTTH services, a time division multiplexing-PON (TDM-PON) system is introduced on the basis of a time division multiplexing (TDM) technology as a multiplexing technique and a double star topology as a network topology. FIG. 1 illustrates a typical double star PON system. In FIG. 1, a reference sign 100 denotes a telecommunications carrier station; 101, a termination (optical line terminal (OLT)) installed in an accommodating station; 102, an m:1 optical splitter at the first stage; 103, a primary subscriber optical fiber line to an area 2; 104, an n:1 optical splitter at the second stage to the area 2; 105, n branched subscriber optical fiber lines; and 106-1 to 106-n, n in-house devices (optical network units (ONUs)) installed in houses of subscribers in the area 2. With a configuration in which a plurality of in-house devices (ONUs) are connected to one termination (OLT), devices and fibers are shared by the plurality of users and the first stage m:1 optical splitter 102 is used so that efficient accommodating in another area can be achieved and an economical FTTH service can be achieved.

Because of characteristics of a network architecture in the PON system, an optical intensity of a transmitted optical signal is evenly divided by the optical splitter that is installed at the connection point between the primary subscriber optical fiber line and the branched subscriber optical fiber lines. In a branching configuration of the optical splitter, for example, if the number of subscribers in the areas 1 to 4 in FIG. 1 is 32, with m is set to four and n is set to eight and the optical intensity of light output from the OLT is reduced to ⅟32 or less due to a branching loss by a 4-branch optical splitter and an 8-branch optical splitter and a transmission line loss caused by the fibers, and such light arrives each ONU. In this way, owing to the branching loss by the optical splitters, a connection loss due to connector connection, and the transmission line loss due to optical fibers, the PON system requires an optical power budget exceeding the above losses to establish communication between the OLT and ONUs. In general, larger optical power budget allows longer distances. In recent years, it is desired to reduce the number of devices by area expansion due to longer distances, and to reduce device cost per user, and reduce power by station integration, and the like.

Here, in the PON system, when the distribution of users is biased, the distances between the OTL and the ONUs may be different from each other. Such a PON system is system-designed such that a level of the received optical intensity at the ONU that is installed farthest is not less than the minimum reception sensitivity because the distances between the OLT and the ONUs are different from each other. Thus, the ONU that is not installed farthest has the loss smaller than that of the farthest ONU, and thus receives surplus energy.

NPL 1 discloses that an access network with high reliability and capability of long-distance transmission can be achieved in consideration of optical energy efficiency when such a distribution of users is biased. NPL 1 discloses that an unequal branch optical splitter is disposed in a communication system, and a branching ratio of the unequal branch optical splitter is determined so that light output from the farthest ONU under each port has the minimum reception sensitivity in an OLT. NPL 1 discloses that, by disposing the unequal branch optical splitter in a star-shaped PON configuration, it is possible to efficiently distribute light from the OLT in accordance with the distance distribution of users from an accommodating station, and to achieve long-distance transmission.

CITATION LIST

Non Patent Literature

NPL 1: OECC2019, TuA3-4 2019.7

SUMMARY OF THE INVENTION

Technical Problem

As described above, in the optical communication system in NPL 1, to increase a transmission distance between passive elements, the split loss of each port is optimized with the branching ratio determined based on the asymmetrical branch configuration of the unequal branch optical splitter and the distance of the farthest ONU, and thus the long distance is achieved.

In the PON, when a trunk fiber is disconnected, communications of all users under the disconnected position are disconnected. As a method for avoiding such a situation, there is a ring topology. Even when the clockwise wiring is disconnected, in the ring topology, communication can be performed by the counterclockwise wiring, and redundancy for fiber disconnection can be obtained.

Unfortunately, the transmission distance of the ring topology is longer than that in a case where a transmission side (for example, an OLT) and a reception side (for example, an ONU) are connected on a one-to-one basis. As described in the background art, in recent years, the demand for station aggregation is increasing, and thus a longer distance is also required in a network of the ring topology.

Figure 2:
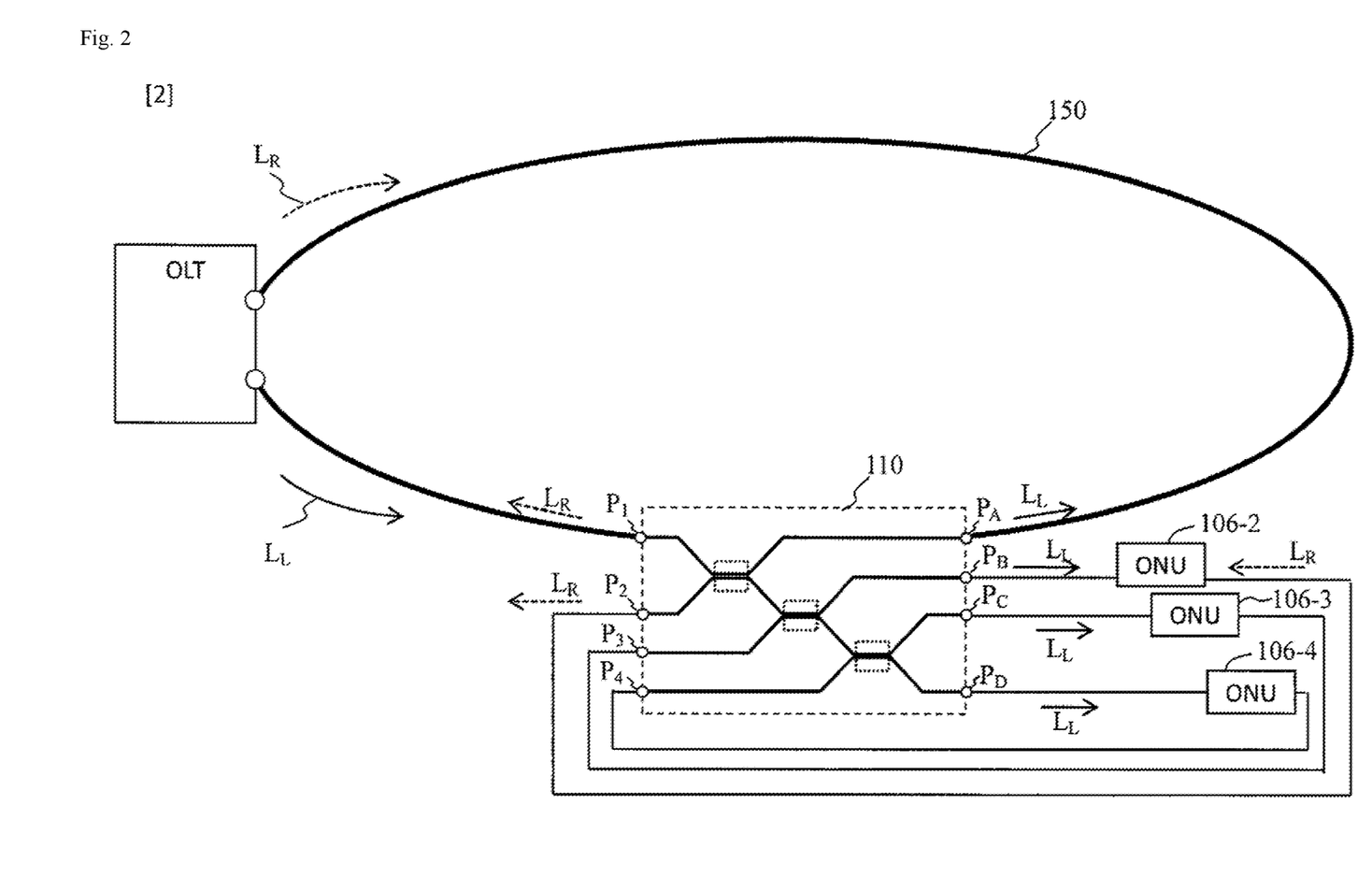
FIG. 2 is a diagram illustrating an issue of the present invention.

As illustrated in FIG. 2, by connecting an input port $P_1$ of an unequal branch optical splitter 110 disclosed in NPL 1 and a long-distance port $P_A$ having a reduced splitting loss to a trunk fiber 150 of the ring topology, it is possible to increase the distance of the ring. Unfortunately, the unequal branch optical splitter 110 has an asymmetric structure. Thus, when ONUs (106-2, 106-3, 106-4) are connected to branch ports ($P_2$, $P_3$, $P_4$, $P_B$, $P_C$, $P_D$) of the unequal branch optical splitter 110 as illustrated in FIG. 2, an optical signal $L_L$ traveling in a leftward direction through the trunk fiber 150 of the ring topology can be received by any ONU, but an optical signal $L_R$ traveling in a rightward direction is output only from the branch port $P_2$ and is not output from the branch ports ($P_3$, $P_4$). Thus, the optical signal $L_R$ can be received only by the ONU 106-2 and reception by other ONUs is not possible. That is, in the ring topology optical communication system, obtaining complete redundancy is difficult even when a known unequal branch optical splitter is connected.

To solve the above issue, an object of the present invention is to provide an optical communication system and an optical communication method capable of achieving a long distance transmission with a passive element and obtaining redundancy of a ring topology.

Means for Solving the Problem

To achieve the above object, the optical communication system according to the present invention includes an unequal branch optical splitter having a symmetrical structure.

Specifically, according to the present invention, there is provided an optical communication system of a passive optical network (PON) in which an optical path of a ring topology is provided. The optical communication system includes a termination (OLT: optical line terminal) configured to be connected to the optical path so that an output optical signal is transmitted in at least one of a rightward direction and a leftward direction of the optical path, one or a plurality of unequal branch optical splitters, each configured to have one primary-side main port, one secondary-side main port, a plurality of primary-side branch ports, and a plurality of secondary-side branch ports, and be connected to the optical path by the primary-side main port and the secondary-side main port, branch the optical signal traveling in the rightward direction from the optical path and output optical signals obtained by branching, from the respective secondary-side branch ports at a predetermined branching ratio, and branch the optical signal traveling in the leftward direction from the optical path and output optical signals obtained by branching, from the respective primary-side branch ports at a predetermined branching ratio, and a network device (ONU: optical network unit) configured to be connected to one of the primary-side branch ports and the secondary-side branch port corresponding to the one primary-side branch port in the unequal branch optical splitter.

In addition, according to the present invention, there is provided an optical communication method in a passive optical network (PON) in which an optical path of a ring topology is provided. The optical communication method includes outputting an optical signal to the optical path so that the optical signal is transmitted in at least one of a rightward direction and a leftward direction of the optical path, connecting an unequal branch optical splitter including one primary-side main port, one secondary-side main port, a plurality of primary-side branch ports, and a plurality of secondary-side branch ports, to the optical path by the primary-side main port and the secondary-side main port, by the unequal branch optical splitter, branching the optical signal traveling in the rightward direction from the optical path and outputting optical signals obtained by branching, from the respective secondary-side branch ports at a predetermined branching ratio, and branching the optical signal traveling in the leftward direction from the optical path and outputting optical signals obtained by branching, from the respective primary-side branch ports at a predetermined branching ratio, and receiving the optical signal from at least one of one of the primary-side branch ports and the secondary-side branch port corresponding to the one primary-side branch port in the unequal branch optical splitter.

Since the unequal branch optical splitter has a target structure, it is possible to output both a rightward optical signal and a leftward optical signal propagating in a ring topology from each port. In addition, since the optical splitter is the unequal branch optical splitter, it is possible to adjust light intensity of the optical signal output to each port, in accordance with a transmission distance.

Thus, according to the present invention, it is possible to provide an optical communication system and an optical communication method capable of achieving a long transmission distance with a passive element and obtaining redundancy of a ring topology.

Here, when the ONU receives the leftward optical signal and the rightward optical signal, the ONU discards the optical signal received later.

In addition, each of the OLT and the ONU may include a detection unit configured to detect a disconnection of the optical path, an optical switch configured to cause the optical signal to be transmitted in any one of the rightward direction and the leftward direction of the optical path, and a control unit configured to, when the detection unit detects the disconnection of the optical path, switch the optical switch.

A specific structure of the unequal branch optical splitter is as follows. The unequal branch optical splitter includes a cross-linking branch optical circuit that is a waveguide optical splitter having two inputs and two outputs, and in which one of the two inputs of the waveguide optical splitter is connected to the primary-side main port, and one of the two outputs of the waveguide optical splitter is connected to the secondary-side main port, and two unequal branch optical circuits configured to be connected to the other of the two inputs and the other of the two outputs of the waveguide optical splitter, respectively. In the unequal branch optical circuit, combinations of (m−1) pieces of the waveguide optical splitters having two inputs and two outputs connect one multiplexing port $P_x$ connected to the cross-linking branch optical circuit and m pieces of demultiplexing ports $P_{y1}$ to $P_{ym}$, m being an integer of 2 or more. In the first waveguide optical splitter, the multiplexing port $P_x$ is connected to one of two inputs by a waveguide, and one of the two outputs, which is directly connected to the multiplexing port $P_x$ is set to the first demultiplexing port $P_{y1}$. In the kth waveguide optical splitter, k being an integer from 2 to (m−2), one of the two outputs of the (k−1)th waveguide optical splitter, which is not connected to the demultiplexing port $P_{y(k-1)}$, is connected to one of two inputs, and one of the two outputs, which is directly connected to the (k−1)th waveguide optical splitter by a waveguide is set to the kth demultiplexing port $P_{yk}$. In the (m−1)th waveguide optical splitter, one of two outputs of the (m−2)th waveguide optical splitter, which is not connected to the demultiplexing port $P_{y(m-2)}$ is connected to one of two inputs, one of two outputs, which is directly connected to the (m−2)th waveguide optical splitter by a waveguide, is set to the (m−1)th demultiplexing port $P_{y(m-1)}$, and the other of the two outputs is set to the demultiplexing port $P_{ym}$. When m is equal to or more than 3, the (m−1)th waveguide optical splitter is provided. When m is equal to or more than 4, the kth waveguide optical splitter is provided.

Note that each of the inventions described above can be combined with each other to the extent possible.

Effects of the Invention

According to the present invention, it is possible to provide an optical communication system and an optical communication method capable of achieving a long transmission distance with a passive element and obtaining redundancy of a ring topology.

DESCRIPTION OF EMBODIMENTS

Embodiments of the present invention will be described with reference to the accompanying drawings. The embodiments described below are examples of the present invention and the present invention is not limited to the embodiments described below. Note that constituent elements with the same reference signs in the specification and the drawings are assumed to be the same constituent elements.

Embodiment 1

In the present embodiment, a PON system that achieves improvement of reliability by normally transmitting light in two directions will be described.

Figure 3:
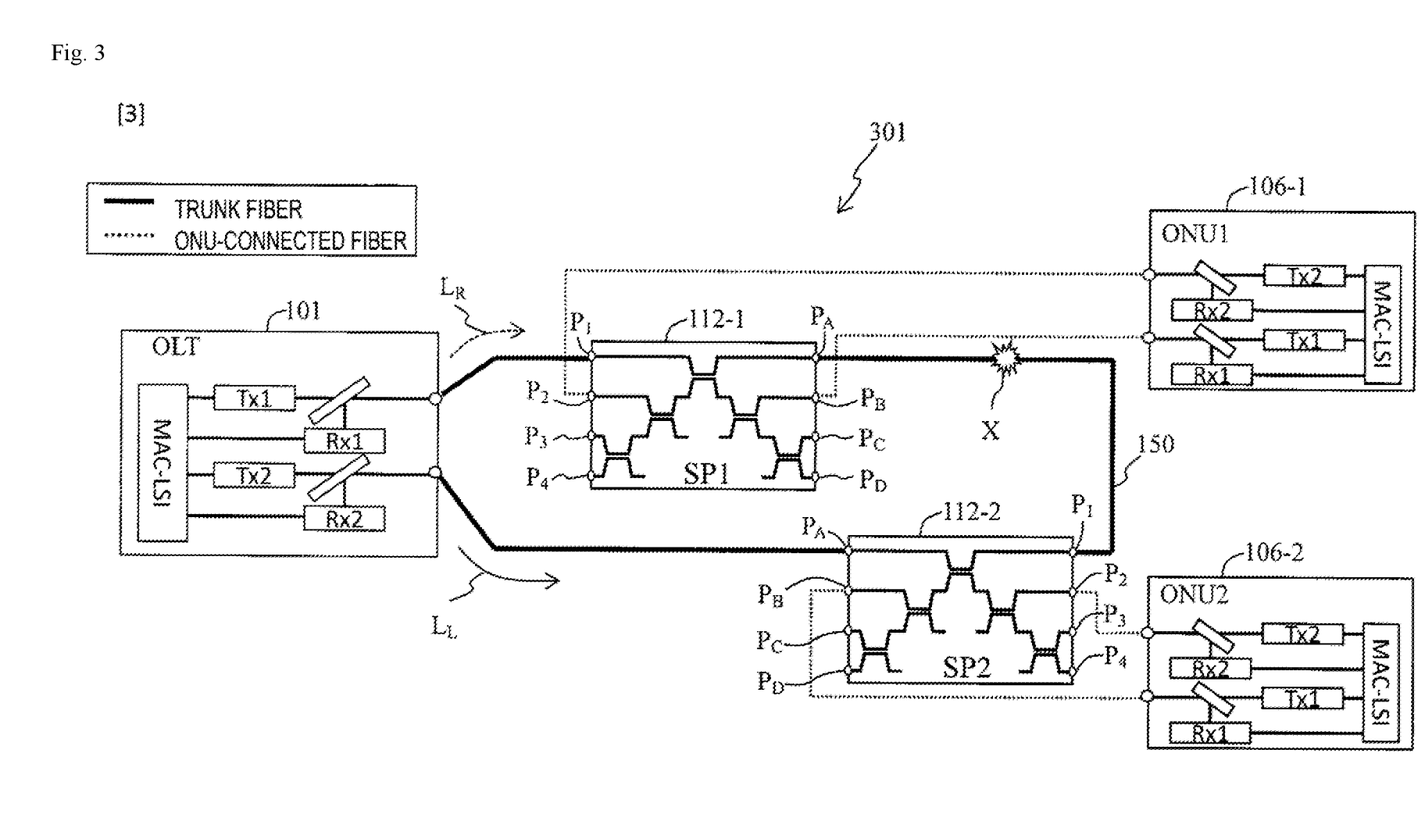
FIG. 3 is a diagram illustrating an optical communication system according to the present invention.

FIG. 3 is a diagram illustrating an optical communication system 301 according to the present embodiment. The optical communication system 301 is an optical communication system of a passive optical network (PON) in which an optical path (trunk fiber) 150 has a ring topology. The optical communication system 301 includes an OLT 101, one or a plurality of unequal branch optical splitters 112, and an ONU 106. The OLT 101 is connected to the trunk fiber 150 so that an output optical signal is transmitted in at least one of a rightward direction $L_R$ and a leftward direction $L_L$ of the trunk fiber 150. The unequal branch optical splitter 112 has one primary-side main port $P_1$, one secondary-side main port $P_4$, a plurality of primary-side branch ports ($P_2$ to $P_4$), and a plurality of secondary-side branch ports ($P_B$ to $P_D$). The unequal branch optical splitter 112 is connected to the trunk fiber 150 by the primary-side main port $P_1$ and the secondary-side main port $P_A$. The unequal branch optical splitter 112 branches the rightward optical signal $L_R$ from the trunk fiber 150 and outputs optical signals obtained by branching, from the respective secondary-side branch ports ($P_B$ to $P_D$) at a predetermined branching ratio. The unequal branch optical splitter 112 branches the leftward optical signal $L_L$ from the trunk fiber 150 and outputs optical signals obtained by branching, from the respective primary-side branch ports ($P_2$ to $P_4$) at a predetermined branching ratio. The ONU 106 is connected to one (for example, $P_2$) of the primary-side branch ports and the secondary-side branch port (for example, $P_B$) corresponding to the primary-side branch port in the unequal branch optical splitter 112. Although FIG. 3 illustrates an example in which the ONU 106 is connected to the ports $P_2$ and $P_B$ of the unequal branch optical splitter 112, the number of ONUs 106 connected to each of the unequal branch optical splitters 112 is not limited to one. The ONU may be connected to the ports $P_3$ and $P_C$ of the unequal branch optical splitter 112, and may be connected to the ports $P_4$ and $P_D$. In this case, three ONUs in maximum are connected to one unequal branch optical splitter 112.

Differing from the unequal branch optical splitter disclosed in NPL 1, the unequal branch optical splitter 112 has a left-right symmetrical structure. In the unequal branch optical splitter 112, the trunk fiber 150 is connected to the ports $P_1$ and $P_4$. The port ($P_2$, $P_3$, $P_4$) and the port ($P_B$, $P_C$, $P_D$) are connection ports to the ONU 106. With this structure, the unequal branch optical splitter 112 outputs light to the port ($P_B$, $P_C$, $P_D$) when the light is incident to the port $P_1$. When light is incident to the port $P_A$, the unequal branch optical splitter 112 outputs light to the port ($P_1$, $P_2$, $P_3$).

In the optical communication system 301, each of the OLT 101 and the ONU 106 is equipped with two transmission and reception units TRx. The rightward optical signal $L_R$ in a downlink direction is transmitted from Tx1 of the OLT 101. A portion of the rightward optical signal is branched by the unequal branch optical splitter 112-1 and received by Rx1 of the ONU 106-1. Then, a portion of the rightward optical signal is further branched by the unequal branch optical splitter 112-2 and received by Rx1 of the ONU 106-2. The leftward optical signal $L_L$ in the downlink direction is transmitted from Tx2 of the OLT 101. A portion of the leftward optical signal is branched by the unequal branch optical splitter 112-2 and received by Rx2 of the ONU 106-2. Then, a portion of the leftward optical signal is further branched by the unequal branch optical splitter 112-1 and received by Rx2 of the ONU 106-1.

The leftward optical signal in an uplink direction is transmitted from Tx1 of the ONU 106-1 and Tx1 of the ONU 106-2, and then received by Rx1 of the OLT. The rightward optical signal in the uplink direction is transmitted from Tx2 of the ONU 106-1 and Tx2 of the ONU 106-2, and then received by Rx2 of the OLT.

As described above, the OLT 101 and the ONU 106 transmit and receive the same signal being the rightward optical signal $L_R$ and the leftward optical signal $L_L$, which means that redundancy of the optical communication system 301 is ensured. Thus, even though a disconnection occurs at any place (for example, point X in FIG. 3) of the trunk fiber 150, the OLT 101 and the ONU 106 can receive a rightward or leftward signal. Thus, it is possible to improve the reliability of the optical communication system 301.

In addition, by adjusting a branch ratio of each waveguide optical splitter that has two inputs and two outputs and constitutes the unequal branch optical splitter 112, it is possible to adjust a branching ratio of light from the port $P_1$ to the port ($P_A$, $P_B$, $P_C$, $P_D$) and a branching ratio of light from the port $P_A$ to the port ($P_1$, $P_2$, $P_3$, $P_4$). That is, it is possible to extend the trunk fiber 150 by reducing the branching ratio to the branch port ($P_B$, $P_C$, $P_D$, $P_2$, $P_3$, $P_4$) and increasing the branching ratio to the main port ($P_A$, $P_1$).

Thus, the optical communication system 301 achieves a long transmission distance between passive elements and obtain the redundancy of the ring topology.

In the optical communication system 301, when the fiber disconnection does not occur, the same optical signal is input to the single ONU 106 from two directions of the rightward direction and the leftward direction. Thus, the ONU 106 uses the optical signal (packet) that has arrived first for communication and discards the optical signal (packet) that has arrived second.

In the optical communication system 301, the two unequal branch optical splitters are disposed in the trunk fiber 150, but to obtain the above effect, the number of unequal branch optical splitters is not limited to two and may be equal to or more than one.

Embodiment 2

In the present embodiment, a PON system that achieves improvement of reliability by detecting fiber disconnection and performing switching between a normal system and an abnormal system will be described.

Figure 4:
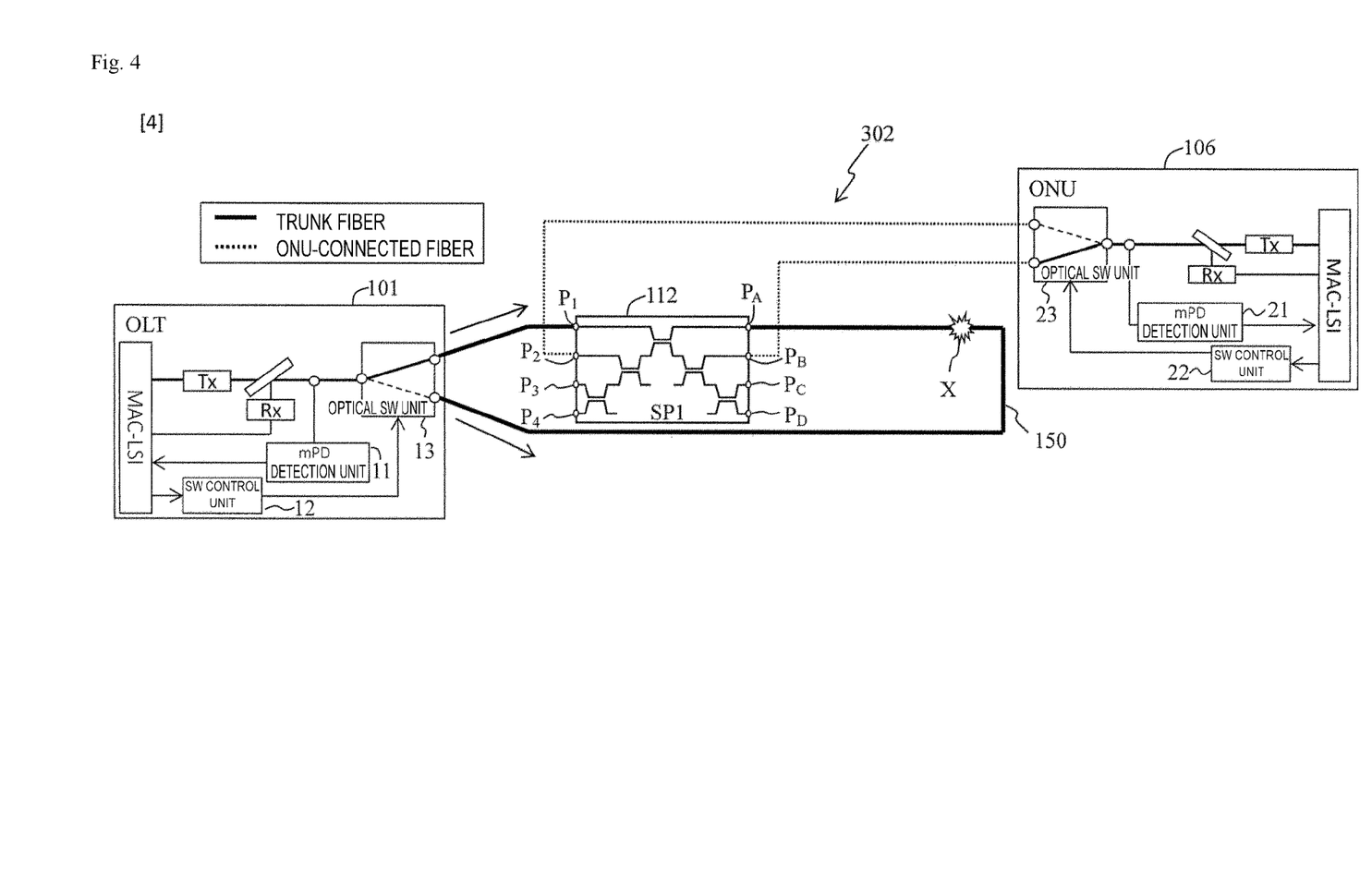
FIG. 4 is a diagram illustrating the optical communication system according to the present invention.

FIG. 4 is a diagram illustrating an optical communication system 302 according to the present embodiment. The optical communication system 302 is different from the optical communication system 301 described in Embodiment 1 in the following points. Each of an OLT 101 and an ONU 106 in the optical communication system 302 include a detection unit (11, 21) that detects a disconnection of a trunk fiber 150, an optical switch (13, 23) that causes an optical signal to be transmitted in any of a rightward direction and a leftward direction of the trunk fiber 150, and a control unit (12, 22) that switches the optical switch (13, 23) when the detection unit (11, 21) detects the disconnection of the trunk fiber 150.

The structure of an unequal branch optical splitter 112 is similar to that described in Embodiment 1.

In the optical communication system 302, the trunk fiber 150 of the ring topology is divided into a normal system and an abnormal system, and the OLT 101 and the ONU 106 perform switching between the normal system and the abnormal system by the optical switches 13 and 23. That is, differing from the optical communication system 301 in Embodiment 1, the optical communication system 302 transmits an optical signal in any one system.

The OLT 101 and the ONU 106 include detection units mPD (monitor photodiodes) 11 and 21 that detect occurrence of a disconnection in the trunk fiber 150, and control units 12 and 22 that receive a notification that the disconnection has been detected, from a MAC unit when the detection units 11 and 21 detect the disconnection, and output a switching command to the optical switches 13 and 23. With this configuration, when the disconnection occurs in the trunk fiber 150, the OLT 101 and the ONU 106 perform switching between a normal system and an abnormal system by the optical switches 13 and 23.

As described above, even though the disconnection occurs at any place (for example, point X in FIG. 4) of the trunk fiber 150, the OLT 101 and the ONU 106 can receive either the rightward signal or a leftward signal by switching the system using the optical switch (13, 23). Thus, it is possible to improve the reliability of the optical communication system 302.

In addition, it is possible to extent the trunk fiber 150 by adjusting the branching ratio of the unequal branch optical splitter 112 as described above.

Thus, the optical communication system 302 achieves a long transmission distance between passive elements and obtain the redundancy of the ring topology.

Third Embodiment

In Embodiments 1 and 2, the unequal branch optical splitter 112 has four ports ($P_1$, $P_2$, $P_3$, $P_4$) on the primary side and four ports ($P_A$, $P_B$, $P_C$, Pp) on the secondary side, but the unequal branch optical splitter in the present invention is not limited thereto.

In the present embodiment, a configuration in which the number of ports of an unequal branch optical splitter 112 is n (n is an integer of 2 or more) on both the primary side and the secondary side will be described.

Figure 5:
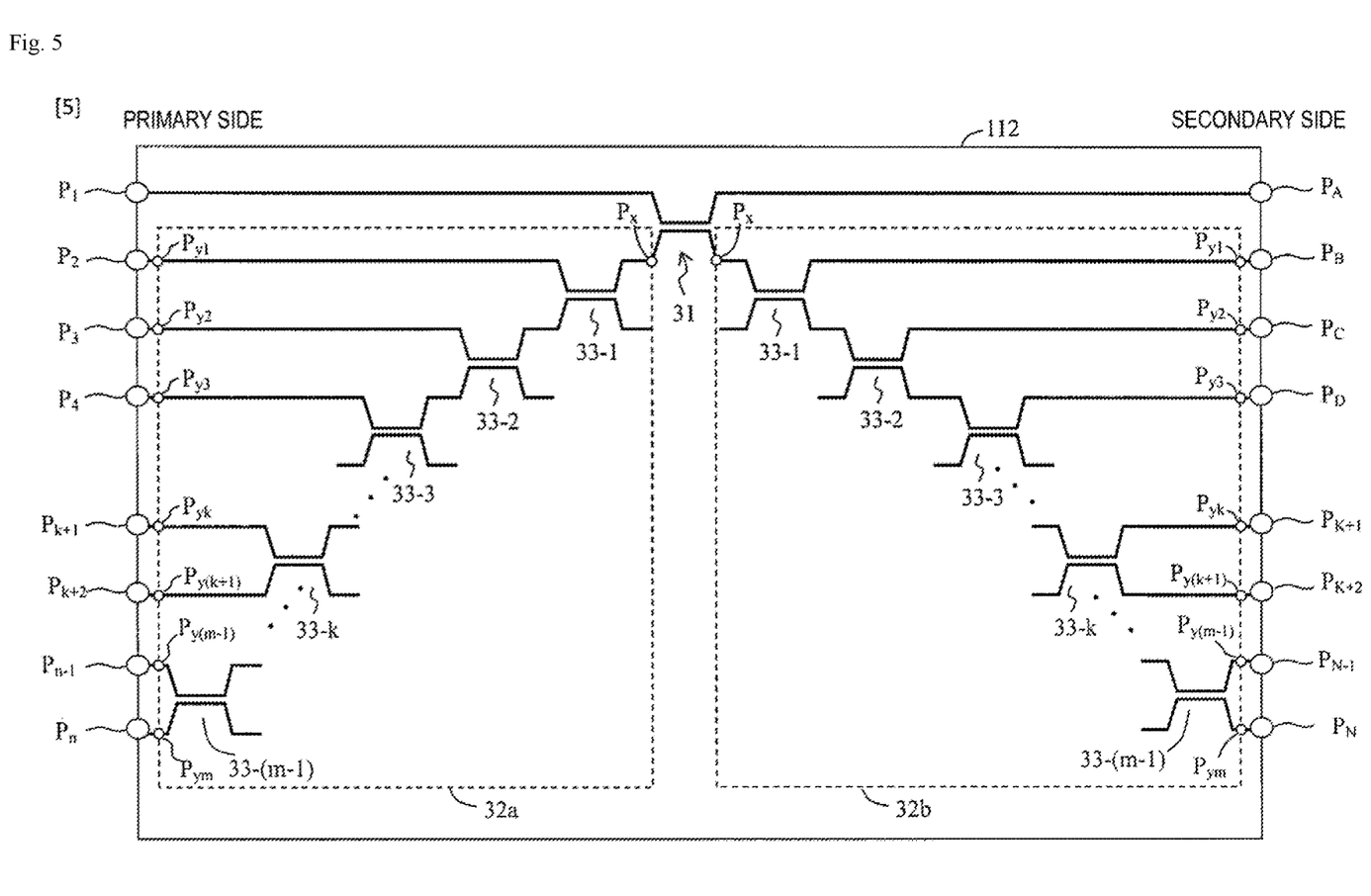
FIG. 5 is a diagram illustrating an unequal branch optical splitter included in the optical communication system according to the present invention.

FIG. 5 is a diagram illustrating a configuration of the unequal branch optical splitter 112. The unequal branch optical splitter 112 includes a cross-linking branch optical circuit 31 and two unequal branch optical circuits (32a and 32b). The cross-linking branch optical circuit 31 is a waveguide optical splitter having two inputs and two outputs. One of the two inputs of the waveguide optical splitter is connected to the primary-side main port $P_1$, and one of the two outputs of the waveguide optical splitter is connected to the secondary-side main port $P_A$. The two unequal branch optical circuits (32a and 32b) are respectively connected to the other of the two inputs and the other of the two outputs of the waveguide optical splitter.

Each of the unequal branch optical circuits (32a and 32b) connects one multiplexing port $P_x$ connected to the cross-linking branch optical circuit 31 to m pieces of demultiplexing ports ($P_{y1}$ to $P_{ym}$), where m is an integer of two or more, by using m−1 pieces of waveguide optical splitters having two inputs and two outputs combined. The multiplexing port $P_x$ is connected to one of two inputs of a first stage waveguide optical splitter 33-1, and one of two outputs of the first stage waveguide optical splitter 33-1, which is directly connected to the multiplexing port $P_x$ via a waveguide, is set to a first demultiplexing port $P_{y1}$. One of two outputs of a (k−1)th stage waveguide optical splitter 33-(k−1), which is not connected to the demultiplexing port $P_{y(k-1)}$, is connected to one of two inputs of a kth stage waveguide optical splitter 33-k, where k is an integer of two to m−2, and one of two outputs of the kth stage waveguide optical splitter 33-k, which is directly connected to the (k−1)th stage waveguide optical splitter 33-(k−1) via a waveguide, is set to the kth demultiplexing port $P_{yk}$. One of two outputs of an (m−2)th stage waveguide optical splitter 33-(m−2), which is not connected to a demultiplexing port $P_{y(m-2)}$, is connected to one of two inputs of an (m−1)th stage waveguide optical splitter 33-(m−1), which is directly connected to an (m−2)th stage waveguide optical splitter 33-(m−2) via a waveguide, is set to an (m−1)th demultiplexing port $P_{y(m-1)}$, and the other of the two outputs is set to a demultiplexing port $P_{ym}$. When m is three or more, the (m−1)th waveguide optical splitter 33-(m−1) is provided. When m is four or more, the kth waveguide optical splitter 33-k is provided. In addition, n is m+1.

The cross-linking branch optical circuit 31 is a waveguide optical splitter having two inputs and two outputs, in which the branch ratio at a wavelength λ1 is $x_0$:100−$x_0$. In the cross-linking branch optical circuit 31, when the input is set to the primary side, one of the two inputs is connected to the main port $P_1$, and the other is connected to the multiplexing-side port $P_x$ of the unequal branch optical circuit 32a. When the output of the cross-linking branch optical circuit 31 is set to the secondary side, one of the two outputs is connected to the main port $P_4$, and the other is connected to the multiplexing-side port $P_x$ of the unequal branch optical circuit 32b.

The unequal branch optical circuit 32a and the unequal branch optical circuit 32b have the same structure. The circuit configuration will be described by using the unequal branch optical circuit 32b.

In the unequal branch optical circuit 32b, combinations of (m−1) pieces of waveguide optical splitters having two inputs and two outputs are connected between one multiplexing port $P_x$ connected to the cross-linking branch optical circuit 31 and m pieces of demultiplexing ports ($P_{y1}$ to $P_{ym}$), where m is an integer of 2 to (n−1). The demultiplexing ports ($P_{y1}$ to $P_{ym}$) are connected to the branch ports ($P_B$ to $P_N$), respectively. N is an integer, similar to n.

In the first waveguide optical splitter 33-1, the multiplexing-side port $P_x$ is connected to the one of the two inputs. In the waveguide optical splitter 33-1, one of the two outputs, which is directly connected to the multiplexing port $P_x$ by a waveguide is set to the first demultiplexing port $P_{y1}$, and the other is connected to one of the two inputs of the second waveguide optical splitter 33-2.

In the kth waveguide optical splitter 33-k, one of the two inputs is connected to one of the two outputs of the waveguide optical splitter 33-(k−1) at the previous stage, which is not connected to the demultiplexing port $P_{y(k-1)}$. In the waveguide optical splitter 33-k, one of the two outputs, which is directly connected to the waveguide optical splitter 33-(k−1) at the previous stage by a waveguide is set to the kth demultiplexing port $P_{yk}$, and the other is connected to one of the two inputs of the waveguide optical splitter 33-(k+1) at the next stage.

In the final waveguide optical splitter 33-(m−1), one of the two inputs is connected to one of the two outputs of the waveguide optical splitter 33-(m−2) at the previous stage, which is not connected to the demultiplexing port $P_{y(m-2)}$. In the waveguide optical splitter 33-(m−1), one of the two outputs, which is directly connected to the waveguide optical splitter 33-(m−2) at the previous stage by a waveguide is set to the (m−1)th demultiplexing port $P_{y(m-1)}$, and the other is set to the demultiplexing port $P_{ym}$.

The branching ratios at the wavelength λ1 in the waveguide optical splitters 33-1 to 33-(m−1) in the unequal branch optical circuit 32a are (33-1) $x_1$:100-$x_1$,
(33-k) $x_k$:100-$x_k$,
(33-(m−1)) $x_{m-1}$: 100-$x_{m-1}$,
and $x_1$ to $x_{m-1}$>0.

In addition, the branching ratios at the wavelength λ1 in the waveguide optical splitters 33-1 to 33-(m−1) in the unequal branch optical circuit 32b are (33-1) $x_1'$: 100-$x_1'$,
(33-k) $x_k'$: 100-$x_k'$,
(33-(m−1)) $x_{m-1}'$: 100-$x_{m-1}'$,
and $x_1'$ to $x_{m-1}'$>0.

The branch ratios (for example, $x_1$ and $x_1'$, $x_k$ and $x_k'$, $x_{m-1}$ and $x_{m-1}'$) of the waveguide optical splitters corresponding to both the unequal branch optical circuits may be the same or different depending on the configuration of the optical communication system.

Fourth Embodiment

Figure 6:
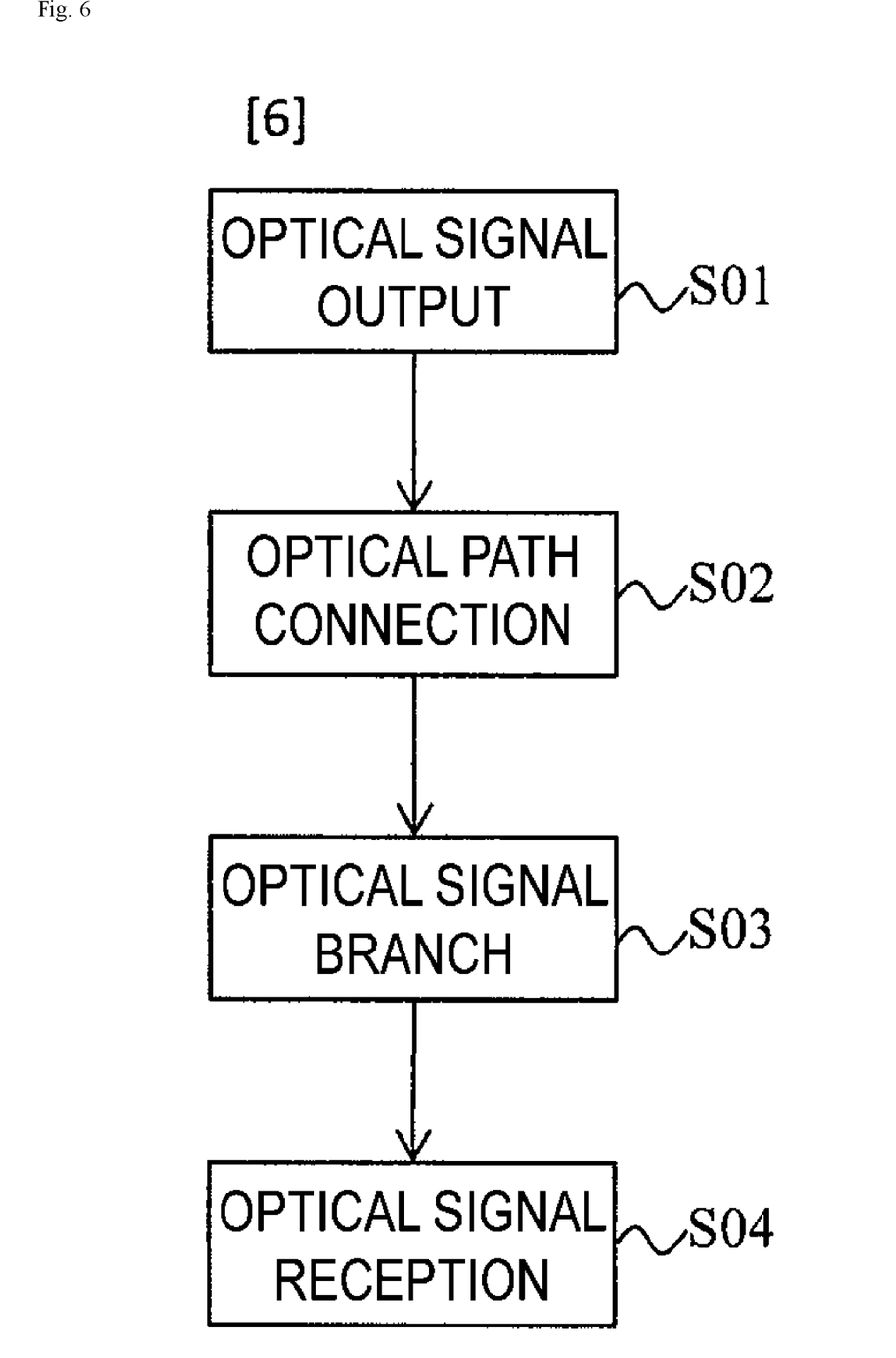
FIG. 6 is a diagram illustrating an optical communication method according to the present invention.

FIG. 6 is a flowchart illustrating an optical communication method in the optical communication system described in Embodiments 1 and 2. The present optical communication method includes outputting an optical signal to an optical path (trunk fiber) 150 so that the optical signal is transmitted in at least one of a rightward direction and a leftward direction of the optical path (Step S01), connecting an unequal branch optical splitter 112 having one primary-side main port $P_1$, one secondary-side main port $P_4$, a plurality of primary-side branch ports ($P_2$ to $P_n$), and a plurality of secondary-side branch ports ($P_B$ to $P_N$) to the optical path by the main port $P_1$ and the main port $P_4$ (Step S02), by the unequal branch optical splitter 112, branching the rightward optical signal from the optical path and outputting the signal obtained by branching, from each of the branch ports ($P_B$ to $P_N$) at a predetermined branching ratio, and branching the leftward optical signal from the optical path and outputting the signal obtained by branching, from each of the branch ports ($P_2$ to $P_n$) at a predetermined branching ratio (Step S03), and receiving, by the same ONU 106, the optical signal output from at least one (both in the case of the optical communication system 301, and either in the case of the optical communication system 302) of one (for example, $P_k$) of branch ports of the unequal branch optical splitter 112 and a branch port (for example, $P_k$) corresponding to the one branch port (Step S04).

Performing such an optical communication method achieves a long transmission distance between the passive element and to obtain redundancy of the ring topology.

REFERENCE SIGNS LIST 11, 21: Detection unit
12, 22: Control unit
13, 23: Optical switch unit
31: Cross-linking branch optical circuit
32a, 32b: Unequal branch optical circuit
33-1, 33-2, . . . , 33-k, . . . , 33-(m−1): waveguide optical splitter
100: Telecommunications carrier station
101: Optical line termination (OLT)
102: m:1 optical splitter
103: Primary subscriber optical fiber line
104: n:1 optical splitter
105: Branched subscriber optical fiber line
106-1 to 106-n: Optical network unit (ONU)
112: Unequal branch optical splitter
150: Trunk fiber

The invention claimed is:

1. An optical communication system of a passive optical network (PON) in which an optical path is laid in a ring topology, the optical communication system comprising:
  a termination device, which is referred to as an optical line terminal (OLT), connected to the optical path so that an optical signal output is transmitted on the optical path in at least one of a clockwise direction or a counterclockwise direction;
  one or more unequal branch optical splitters having one primary-side main port, one secondary-side main port, a plurality of primary-side branch ports, and a plurality of secondary-side branch ports and connected to the optical path via the primary-side main port and the secondary-side main port, the one or more unequal branch optical splitters configured to branch the optical signal transmitted clockwise from the optical path, output optical signals obtained by branching from the respective secondary-side branch ports at a predetermined branching ratio, branch the optical signal transmitted counterclockwise from the optical path, and output optical signals obtained by branching from the respective primary-side branch ports at a predetermined branching ratio; and a network device, which is referred to as an optical network unit (ONU), connected to one primary-side branch port of the plurality of primary-side branch ports and a secondary-side branch port of the plurality of secondary-side branch ports corresponding to the one primary-side branch port in the unequal branch optical splitter.

2. The optical communication system according to claim 1, wherein
when the ONU receives the optical signal transmitted counterclockwise and the optical signal transmitted clockwise, the ONU discards the optical signal received later.

3. The optical communication system according to claim 1, wherein
the OLT and the ONU include
a detection unit configured to detect disconnection of the optical path,
an optical switch configured to cause the optical signal to be transmitted on the optical path either clockwise or counterclockwise, and
a control unit configured to switch the optical switch when the detection unit detects the disconnection of the optical path.

4. The optical communication system according to claim 1, wherein
the unequal branch optical splitter includes
a cross-linking branch optical circuit that is a waveguide optical splitter having two inputs and two outputs, in which one of the two inputs of the waveguide optical splitter is connected to the primary-side main port, and one of the two outputs of the waveguide optical splitter is connected to the secondary-side main port, and
an unequal branch optical circuit connected to the other of the two inputs of the waveguide optical splitter and another unequal branch optical circuit connected to the other of the two outputs of the waveguide optical splitter, and
the unequal branch optical circuit
connects one multiplexing port $P_x$ connected to the cross-linking branch optical circuit and m pieces of demultiplexing ports $P_{y1}$ to $P_{ym}$, where m is an integer of two or more, by using m−1 pieces of the waveguide optical splitters having two inputs and two outputs combined,
the multiplexing port $P_x$ is connected to one of two inputs of a first stage of the waveguide optical splitter, and one of two outputs of the first stage of waveguide optical splitter, which is directly connected to the multiplexing port $P_x$ via a waveguide, is set to a first demultiplexing port $P_{y1}$,
one of two outputs of a (k−1)th stage of the waveguide optical splitter, which is not connected to a demultiplexing port $P_{y(k-1)}$, is connected to one of two inputs of a kth stage of the waveguide optical splitter, where k is an integer from two to m−2, and one of two outputs of the kth stage of the waveguide optical splitter, which is directly connected to the (k−1)th stage of the waveguide optical splitter via a waveguide, is set to a kth demultiplexing port $P_{yk}$, and one of two outputs of an (m−2)th stage of the waveguide optical splitter, which is not connected to a demultiplexing port $P_{y(m-2)}$, is connected to one of two inputs of an (m−1)th stage of the waveguide optical circuit, one of two outputs of the (m−1)th stage of the waveguide optical splitter, which is directly connected to the (m−2)th stage of the waveguide optical splitter via a waveguide, is set to an (m−1)th demultiplexing port $P_{y(m-1)}$, and the other of the two outputs is set to a demultiplexing port $P_{ym}$, where the (m−1)th stage of the waveguide optical splitter is provided when m is three or more, and the kth waveguide optical splitter is provided when m is four or more.

5. An optical communication method in a passive optical network (PON) in which an optical path laid in a ring topology, the optical communication method comprising:
outputting an optical signal to the optical path so that the optical signal is transmitted on the optical path in at least one of a clockwise direction or a counterclockwise direction;
connecting an unequal branch optical splitter including one primary-side main port, one secondary-side main port, a plurality of primary-side branch ports, and a plurality of secondary-side branch ports, to the optical path via the primary-side main port and the secondary-side main port;
by the unequal branch optical splitter, branching the optical signal transmitted counterclockwise from the optical path, outputting optical signals obtained by branching, from the respective secondary-side branch ports at a predetermined branching ratio, branching the optical signal transmitted counterclockwise from the optical path, and outputting optical signals obtained by branching, from the respective primary-side branch ports at a predetermined branching ratio; and
receiving the optical signal from at least one of one primary-side branch port of the plurality of primary-side branch ports or a secondary-side branch port of the plurality of secondary-side branch ports corresponding to the one primary-side branch port in the unequal branch optical splitter.

6. The optical communication method according to claim 5, comprising:
by an ONU in the PON, when the ONU in the PON receives the optical signal transmitted counterclockwise and the optical signal transmitted clockwise, discarding the optical signal received later.

7. The optical communication method according to claim 5, comprising:
by an OLT and ONU in the PON,
detecting disconnection of the optical path; and
when the disconnection of the optical path is detected, switching an optical switch and transmitting the optical signal on the optical path either clockwise or counterclockwise.

* * * * *